United States Patent [19]
Abramowicz et al.

[11] Patent Number: 5,930,442
[45] Date of Patent: Jul. 27, 1999

[54] ACRYLIC FLEXIBLE LIGHT PIPE OF IMPROVED THERMAL STABILITY

[75] Inventors: Mark Allan Abramowicz, Fairless Hills; Michael Paul Hallden-Abberton, Maple Glen; Casmir Stanislaus Ilenda, Holland; William James Work, Huntingdon Valley, all of Pa.

[73] Assignee: Rohm and Haas Company, Philadelphia, Pa.

[21] Appl. No.: 08/950,020

[22] Filed: Oct. 14, 1997

[51] Int. Cl.$^6$ .............................. G02B 1/04; B29C 47/88
[52] U.S. Cl. ................. 385/143; 385/141; 385/123; 264/1.24; 264/1.28; 264/1.29; 264/1.6
[58] Field of Search ..................... 385/141–145, 385/123; 525/67, 71, 307, 309; 264/1.24, 1.29, 1.38, 1.7, 173.16; 428/375, 376, 394, 395, 373; 526/64, 220, 329.2

[56] References Cited

U.S. PATENT DOCUMENTS

| | | | |
|---|---|---|---|
| 5,298,327 | 3/1994 | Zarian et al. | 428/373 |
| 5,318,737 | 6/1994 | Trabert et al. | 264/173.16 |
| 5,406,641 | 4/1995 | Bigley et al. | 385/141 |
| 5,485,541 | 1/1996 | Bigley et al. | 385/141 |
| 5,555,525 | 9/1996 | Ho et al. | 385/141 |
| 5,773,520 | 6/1998 | Bertelo et al. | 525/309 |

*Primary Examiner*—Hemang Sanghavi
*Attorney, Agent, or Firm*—Guy T. Donatiello; Darryl P. Frickey

[57] ABSTRACT

Acrylic light pipe as described in Bigley et al., U.S. Pat. Nos. 5,406,641 and 5,485,541, has adequate thermal stability for many purposes. It has been found that improved thermal stability, as reflected in color formation, can be imparted by adjusting the polymerization conditions to produce the uncured core polymer of the core/clad construction with a much reduced terminal vinyl content, preferably below 0.5 vinyl groups/1000 monomer units.

11 Claims, No Drawings

ACRYLIC FLEXIBLE LIGHT PIPE OF IMPROVED THERMAL STABILITY

BACKGROUND OF THE INVENTION

1. Field of the Invention

This invention relates to processes, continuous processes and related compositions for producing a more thermally stable flexible light pipe ("FLP") based on polymerized units of one or more acrylic esters, and the improved FLP product which the process produces.

2. Description of the Prior Art

An effective process for preparation of acrylic-based flexible light pipe is disclosed in two patents to Bigley et al., U.S. Pat. Nos. 5,406,641 and 5,485,541. In a preferred aspect of this process, a crosslinkable core mixture is present which comprises an uncrosslinked copolymer formed mainly from acrylic esters and monomers with functionally reactive alkoxysilane groups, along with a reactive additive to cure the uncrosslinked core polymer by crosslinking it, the reactive additive preferably being water and a silane condensation reaction catalyst, such as an organotin dicarboxylate. The core mixture is preferably polymerized by a bulk (non-solvent) process, more preferably by a continuous bulk process, the uncrosslinked copolymer preferably being devolatilized prior to co-extrusion with a cladding, preferably of a fluoropolymer, into a core/clad composite which is then separately cured to the final flexible light pipe.

The process based on a monomer such as ethyl acrylate taught by Bigley et al. yields a flexible light pipe or optical conduit which has high white light transmission, and acceptable flexibility and hardness for a variety of uses where light is to be conveyed from a remote source to a target and where the conduit needs to be flexible to follow a tortuous path, yet hard enough to retain its critical geometry.

The existing process further produces a FLP of adequate thermal and photothermal (joint exposure to heat and to visible light which may contain light of wavelengths known as the "near ultraviolet") stability even after exposures to long hours of light and ambient heat. The prior art polymer has adequate stability for exposure to higher temperatures, including those up to about 90° C., for shorter use times.

However, there is a potential large market for light pipe which is thermally and photothermally stable at higher temperatures and longer exposure times, such as in automotive uses where the light is conducted near the engine compartment, and temperatures of 150° C. or higher may be reached. Other potential uses where high temperatures may be encountered may be when the light source is not adequately shielded from the connection with the FLP, or where the light source is of extremely high intensity. Bigley et al. teach in general the use of stabilizers as part of the core component, but do not specifically teach or suggest an acceptable answer to this important stabilization problem.

We have discovered an improved process by which to prepare a crosslinkable acrylic core for a FLP which, after curing to crosslink, exhibits surprisingly improved stability to thermal aging while retaining its other desirable properties of good initial clarity, absence of initial color, good flexibility, adequate or somewhat improved photothermal stabilization, and adequate hardness to prevent physical distortion. An improved product, especially toward thermal aging in the absence of light being passed through the core, can be prepared by carefully controlling the temperature of the process, preferably shortening somewhat the residence time in the reactor, and controlling the nature of the initiator, so as to decrease the number of terminal vinyl groups in the polymer.

SUMMARY OF THE INVENTION

More specifically, we have discovered a crosslinkable core mixture for a subsequently-cure cured composite which mixture contains a thermoplastic core polymer, the thermoplastic core polymer having a weight average molecular weight from about 2,000 to about 250,000 daltons and a vinyl end-group content of below 0.5 per 1000 monomer units, the core mixture comprising (a) a thermoplastic core polymer comprising
  i) from 80 to 99.9 weight percent of polymerized units of a $C_1$–$C_{18}$ alkyl acrylate or mixtures thereof with up to 50 weight percent of the $C_1$–$C_{18}$ alkyl acrylate being of polymerized units of a $C_1$–$C_{18}$ alkyl methacrylate;
  ii) from 0.1 to 18.2 weight percent of polymerized units of a functionally reactive monomer, and
  iii) from 0 to about 10 weight percent of polymerized units of a refractive index increasing monomer selected from styrene, benzyl acrylate, benzyl methacrylate, phenylethyl acrylate or phenylethyl methacrylate;
  iv) 0.002 to 0.3, preferably 0.01 to 0.3, weight percent of residual molecules of or of decomposition products of an initiator of polymerization, including end groups on the thermoplastic core polymer, the initiator having a half-life at 60° C. of 20 to 400 minutes, preferably 100–250 minutes;
  v) 0.2 to 2.0, preferably 0.6 to 1.5, weight percent of residual molecules of or of decomposition products of a chain transfer agent, including end groups on the thermoplastic core polymer;

(b) from 0.1 to 10 weight percent, based on the crosslinkable core mixture weight, of a reactive additive.

It is preferred that the crosslinkable core mixtures exhibit the percentage of polymerized units of a $C_1$–$C_{18}$ alkyl acrylate as 80 to 99.5 weight percent ethyl acrylate, further preferred that the chain transfer agent is an aliphatic mercaptan of from one to twenty carbon atoms, such as butyl mercaptan, dodecyl mercaptan, and the like, and further preferred that the initiator of polymerization is an azo compound.

It is further preferred that the crosslinkable core mixtures maintain the functionally reactive monomer as present at a level of from about 0.5 to about 12 weight percent, more preferably 2 to 12 weight percent, and it be selected from 2-methacryloxyethyltrimethoxysilane, 3-methacryloxypropyltrimethoxysilane, 3-acryloxypropyltrimethoxysilane, vinyltrimethoxysilane, vinyltriethoxysilane, or mixtures of these, preferably 3-methacryloxypropyltrimethoxysilane. Further, it is preferred that the reactive additive is water and a silane condensation reaction catalyst, preferably a dialkyltin dicarboxylate, such as dibutyltin diacetate.

DESCRIPTION OF THE PREFERRED EMBODIMENTS

In the initial work described in U.S. Pat. No. 5,485,541, the curing for the alkoxysilane functionally reactive monomers is carried out by injecting water, an organotin catalyst, and (optionally) a solvent for the catalyst after the polymerization is complete but prior to co-extrusion with the cladding. It has been found that a curable core may be prepared when the organotin catalyst and the solvent for the catalyst are present during the polymerization, and then either there is addition of water just prior to the co-extrusion, or curing is conducted, after extrusion, in the presence of ambient diffused water. The latter process has been accelerated to a practical level by using a humidified oven or by curing in a highly humid controlled atmosphere. The advantage to the separation of water from the other components until the polymerization and cladding are complete is that premature crosslinking does not occur, with subsequent effects on extrusion and on the surface between core and clad. Samples clad with THV, which is more permeable to water than FEP, can be externally cured rapidly enough for the present purposes (without absorbing so much water that hazing occurs) at temperatures of 80° C. and 50% relative humidity, whilst samples clad with FEP can be cured rapidly enough for the present purposes at 85° C. and 85% relative humidity.

This crosslinkable core mixture may further contain a cladding polymer, such as a fluoropolymer which surrounds the core mixture, and preferably the crosslinkable core mixture within the extruded fluoropolymer cladding and the extruded fluoropolymer cladding are in substantially complete contact. It should be recognized that the thermoplastic crosslinkable core polymer and the cladding do not form a chemical or physical admixture, but are adjacent to each other in the construct which is the core mixture surrounded by the cladding.

We further have discovered, based upon the above-described crosslinkable core polymers, a flexible light pipe product containing the crosslinked core mixture described above, wherein the product has: good light transmittance wherein the differential transmission loss between light wavelengths of 400 nm and at 600 nm is equal to or less than 1.0 decibel per meter as measured by a non-destructive interference filter method; excellent thermal stability, wherein a change in the differential transmission loss between light wavelengths of 400 nm and at 600 nm is equal to or less than 1.0 decibel per meter after >100 hours of exposure to a temperature of 120° C., as measured by a non-destructive interference filter method; good flexibility, wherein the product, at 20° C., survives without core fracture a 180° bend at a bend radius which is less than or equal to five times the diameter of the cured core; and good hardness properties, wherein the Shore "A" hardness is less than 90 after 50 days of exposure at 120° C.

I further have discovered a process for preparing a crosslinkable core mixture for a subsequently-cured composite comprising a coextruded cladding polymer and a coextruded crosslinkable core mixture, which mixture contains a thermoplastic core polymer having a weight average molecular weight from about 2,000 to about 250,000 daltons and a vinyl end-group content of below 0.5 per 1000 monomer units, the process comprising a.) preparing an admixture of
  i) from about 80 to about 99.9 weight percent of a bulk monomer mixture selected from a $C_1$–$C_{18}$ alkyl acrylate or mixtures thereof with up to 50 weight percent of the bulk monomer mixture of a $C_1$–$C_{18}$ alkyl methacrylate;
  ii) from about 0.1 to about 18.2 weight percent of a functionally reactive monomer, and
  iii) from 0 to about 10 weight of a refractive index increasing monomer selected from styrene, benzyl acrylate, benzyl methacrylate, phenylethyl acrylate or phenylethyl methacrylate;
b) adding 0.002 to 0.3 weight percent, based on the uncrosslinked copolymer weight, of an initiator of polymerization which has a half-life at 60° C. of 20 to 400 minutes, preferably 100–250 minutes;
c) prior to, simultaneously, or after the addition of the initiator, adding 0.2 to 2.0 weight percent, preferably 0.75 to 1.5 weight percent, based on the uncrosslinked copolymer weight, of a chain transfer agent;
d) charging the monomer admixture, initiator, and chain transfer agent reaction mixture to a constant-flow stirred reactor heated to 70–120°C., preferably 85–100° C., with a preferred residence time of 5 to 30 minutes, more preferably 20–28 minutes, to form a polymerized, non-crosslinked, crosslinkable core mixture;
e) discharging the polymerized, non-crosslinked, crosslinkable core mixture to a devolatilizing apparatus to remove unreacted monomers;
f) prior to, during, or after the devolatilization and/or co-extrusion, adding from 0.1 to 10 weight percent, based on the crosslinkable core mixture, of a reactive additive;
g) coextruding the crosslinkable core mixture and the cladding polymer to form a curable composite.

In this process, it is separately preferred that the coextruded cladding polymer and a coextruded crosslinkable core mixture be continuously, concurrently and coaxially extruded, that the cladding polymer be a molten fluoropolymer as described earlier, that the extruded crosslinkable core mixture within the extruded fluoropolymer cladding and the extruded fluoropolymer cladding be in substantially complete contact after filling the extruded tubular cladding with the extruded crosslinkable core mixture, and that the curing is conducted subsequently and separately from the extrusion and cladding operation. Further, a portion of the reactive additive may be added to the core mixture after extrusion, such as by diffusion of water through the cladding.

I further have discovered a flexible light pipe product by either of the above processes, wherein the product has good light transmittance wherein the differential transmission loss between light wavelengths of 400 nm and at 600 nm is equal to or less than 1.0 decibel per meter as measured by a "cut-back" interference filter method; excellent thermal stability, wherein a change in the differential transmission loss between light wavelengths of 400 nm and at 600 nm is equal to or less than 1.0 decibel per meter after >100 hours of exposure to a temperature of 120° C., as measured by a non-destructive interference filter method; good flexibility, wherein the product, at 20° C., survives without core fracture a 180° bend at a bend radius which is less than or equal to five times the diameter of the cured core; and good hardness properties, wherein the Shore "A" hardness is less than 90 after 50 days of exposure at 120° C.

Although not wishing to be bound by any theory of stability of polymers, it is believed that it is deleterious to thermal and, to a much lesser extent, photochemical stability if the crosslinkable core polymer contains oligomers or polymers with terminal vinyl groups. Such oligomers or polymers may, in the presence of heat and/or light, form molecules with conjugated double bonds which eventually, with sufficient conjugation, form species which are color absorbers in the visible region of the spectrum, as well as lowering the amount of light which is delivered by the light pipe to the final source. Such vinyl double bonds, apart from residual monomer which can be reduced by carrying the reaction to higher conversion and/or devolatilization of the crosslinkable core prior to curing or crosslinking, may be formed by hydrogen abstraction followed by chain cleavage, or other forms of radical attack. These radicals may be, for example, from the initiator, some reaction product of the initiator, or from hydroperoxides formed in the presence of oxygen. The double bonds may also be formed by some form of termination reaction during the polymerization, even in the presence of a chain transfer agent used to reduce the molecular weight and keep the crosslinkable core polymer fluid in the melt prior to cladding and curing.

It has surprisingly been found that reduction of the reaction temperature and of the amount of initiator, preferably accompanied by a lowering of the residence time in the continuous reactor, is sufficient to make significant improvements in the initial color of the polymer core before and after curing, and to increase the thermal lifetime, as defined below, at 120° C., in the absence of any thermal or thermaloxidative stabilizing additives. These results, especially relating to residence time in the reactor and to the temperature of polymerization, would not have been expected by one of ordinary skill in the art of bulk polymerization of acrylate monomers.

The experimentation to study thermal stability was conducted by a tube-filling process, but the process can readily be adapted to the continuous method described in Bigley et al. for preparing a flexible light pipe.

A standard laboratory process was employed as the control, following the method of Example 1 (tube filling) and Example 29 (compositional details) of U.S. Pat. No. 5,485,541. The monomer composition is 95% EA (purified through acidic alumina) and 5% distilled MATS (3-methacryloxypropyltrimethoxysilane). Vazo 67, (DuPont) 2,2'-azobis(2-methylbutyronitrile) initiator is used at a level of 0.064% of the monomer. A chain transfer agent, n-dodecyl mercaptan, is used at a level of 1% of the amount of monomer. The standard reactor temperature is 125° C. and the standard residence time is 28 minutes. After devolatilization, the polymer is used to fill FEP/polyethylene tubes. Catalyst (20 ppm dibutyltin diacetate based on polymer) and water (0.40%) are mixed into the polymer as it is pumped into the tubes. Several variations in this polymer were used. The variations are summarized in Table 1 (below), along with measurements of initial color.

The following outlines the details of the standard polymerization, which is used as the basis for the process changes listed in Table I: Monomer mixes are prepared as follows: To a 19 liter 316 stainless steel vessel were added and mixed 9500 g of ethyl acrylate, 500 grams of the functionally reactive monomer, 3-methacryloxypropyltrimethoxysilane (MATS) (5 wt. % based on monomer weight (b.o.m.), 6.4 g. of initiator (recrystallized 2,2'-azobis(2-methylbutyronitrile) (0.064 wt. %) and 100 g. of n-dodecyl mercaptan (1 wt. %). The mixture was sparged for at least 15 minutes with nitrogen and degassed under 28 inches (711 mm.) vacuum as it was pumped into the reactor.

The monomer mix was fed through a 0.045 micron PTFE membrane cartridge filter to a 2000 ml stainless steel constant flow stirred tank reactor (CFSTR). During polymerization, flow rates for the 2000 ml CFSTR are ca. 70 g/min. to produce a 28-minute residence time. The CFSTR was equipped with multiple (6) blade 45° pitch turbine agitators. During polymerization, the reactors are held at 125° C., and agitated at 225 rpm under a pressure of 1035 kPa (150 psi). Reactor effluent (copolymer and residual monomer) was fed through a back-pressure valve set nominally at 1035 kPa (150 psi) into a devolatilization column comprising a stainless steel twisted-tape motionless mixer (60 cm. in length with a jacket of about 50 cm length) mounted on an 39-liter (ca. 9-gallon) stainless steel catchpot. Heating oil recirculated through the column jacket was held at 200° C. at the jacket inlet. The catch-pot was held at 100–110° C. and ca. 300–400 mm. of vacuum during devolatilization. Upon completion of the polymerization, the catch-pot was back-filled with filtered nitrogen.

The monomer-to-polymer conversion of the effluent was approximately 87–88%, as measured gravimetrically. Gravimetrically determined solids content of the devolatilized polymer typically is 99.5 wt.

It should be noted that in later runs, conditions were changed as follows: 2.08 grams of 2,2'-azobis(2,4-dimethylvaleronitrile); 150 grams n-dodecyl mercaptan; reaction temperature 95° C.; 90 grams/min. feed rate; 22.2 minute residence time; 79–80% conversion prior to devolatilization. Measurements of color and loss on these samples are made by methods taught in U.S. Pat. No. 5,485,541, viz., monitored with a non-destructive interference filter method. This method employed sections of light pipe 1.8 m in length and the source, integrating sphere and interference filters. For white light measurements, the excitation is restricted mainly to the visible spectrum through use of a hot mirror. The sample length is measured, its transmission is monitored with various filters, it is aged and then re-measured. Changes are monitored through the ratio of short wavelength transmission values relative to transmission at 600 nm.; absorption at such long wavelengths is relatively unaffected by degradation, except in the most severe cases. Because only changes in transmission are studied, reflective losses and refractive index dispersion effects can be neglected. Percentage decreases in the ratio of short wavelength to 600 nm absorbance are treated as loss percentages over the length of the sample; the resultant values are termed the "changes in differential loss".

TABLE 1

| | | Polymer Composition and Initial Color | | | |
|---|---|---|---|---|---|
| Polymer ID | RM Variables | Process Variables | Vinyl Content | $A_{400}-A_{600}$ | $A_{450}-A_{600}$ |
| 1a | Standard | Standard | 0.80 | 3.61 | 0.65 |
| 1b | MATS with 4-OH-TEMPO | Standard | 0.84 | 1.77, 1.58 | 0.52, 0.46 |
| 2a | 1.5% nDDM | Standard | 0.48 | | |
| 2b | 1.5% nDDM | Standard | 0.49 | | |
| 2c | 1.5% nDDM | Standard | 0.51 | | |
| 2d | 1.5% nDDM | Standard | 0.49 | 1.05 | 0.39 |
| 3 | 0.6% t-BuSH | Standard | 1.5 | 1.06, 1.01, 1.06 | 0.41, 0.38, 0.38 |
| 4a | 0.5% ETEMA | Standard | 1.7 | 1.83, 1.73 | 0.55 |
| 4b | 28.5% BMA + 0.5% ETEMA | Standard | 1.3 | 1.92, 1.87 | 0.72, 0.63 |
| 4c | 28.5% BMA | Standard | 1.5 | 3.41, 0.92 | 1.11, 0.33 |
| 5 | Standard | 95° C. | 1.3 | 1.39, 1.19 | 0.38, 0.39 |

TABLE 1-continued

Polymer Composition and Initial Color

| Polymer ID | RM Variables | Process Variables | Vinyl Content | $A_{400}-A_{600}$ | $A_{450}-A_{600}$ |
|---|---|---|---|---|---|
| 6 | Standard | 22' | 1.4 | 1.13, 1.01 | 0.38, 0.36 |
| 7a | 0.032% Vazo 67 | 105° C. | 0.42 | 0.77, 0.81 | 0.30, 0.36 |
| 7b | 0.6% t-BUSH | 105° C. | 0.88 | 1.07, 0.87 | 0.43, 0.35 |
| 7c | MATS with 4-OH-TEMPO | 105° C. | 0.52 | 1.22, 1.12 | 0.49, 0.46 |
| 8a | 0.0208% Vazo 52 | 95° C., 22' | 0.21 | 0.84 | 0.31 |
| 8b | 0.0208% Vazo 52, 1.5% nDDM | 95° C., 22' | 0.14 | 0.74 | 0.25 |
| 8c | 0.0208% Vazo 52 | 95° C., 22' | 0.31 | 0.94, 0.96 | 0.28, 0.26 |
| 8d | 0.0208% Vazo 52, 1.5% nDDM | 95° C., 22' | 0.30 | 0.89, 0.83 | 0.24, 0.25 |

ETEMA = ethylthioethyl methacrylate
Vazo 52 = DuPont 2,2'-azobis(2,4-bimethylvaleronitrile), a lower temperature initiator (half-life at 60° C. is ca. 188 minutes;
Vazo 67, DuPont 2,2'-azobis(2-methylbutyronitrile) initiator; half life at 60° C. is ca. 1880 minutes;
MATS = 3-methacryloxypropyltrimethoxysilane;
4-OR-TEMPO = 4-hydroxy-2,2,6,6-tetramethylpiperidine-N-oxyl, an inhibitor for premature polymerization of MATS during purification;
nDDM = n-dodecyl mercaptan;
t-BuSH = t-butyl mercaptan ;
BMA = butyl methacrylate.

Table 1 lists the actual polymers that were prepared and evaluated. The fourth column lists the terminal vinyl content measured from the NMR spectra of the devolatilized but uncured polymer. The vinyl content refers to the group $$CH_2=CR_1-P,$$

where P represents the polymer chain, and $R_1$ is —COO—$C_2H_5$. The low vinyl content has been associated with increased stability. The low temperature conditions give lower vinyl contents. The presence of this type of terminal unsaturation is quite unexpected for degraded polymer; the art strongly suggests that an internal double bond, such as $$P-CH=CR_1-P,$$

is more likely to be formed, but such is not detected in the spectra.

The initial color was used as one measure of the polymer. The color was measured on a 6 foot (1.83 meters) piece by the standard method. The color is measured by the difference in absorption at 450 and at 600 nm ($A_{450}-A600$). Similarly, the 400 nm color equals $A_{400}-A_{600}$. The results indicate that the low color polymers are made by a low temperature process.

Thermal Degradation

The absorption vs. wavelength of a 6 foot (1.83 meter) section of light pipe is measured. The sample is thermally aged in a forced air oven at 120° C. Periodically, the light pipe is removed from the oven and the absorption spectrum is measured. We have calculated lifetime with four different criteria:

| | |
|---|---|
| $A_{400}$ increase = 1 dB/m | The lifetime is the time at which the increase in 400 nm absorption ($A_{400}-A_{600}$) = 1 dB/m. This is the criterion that has been used historically. |
| $A_{400}$ = 2 dB/m | The lifetime is the time at which the 400 nm absorption ($A_{400}-A_{600}$) = 2 dB/m. |
| $A_{450}$ increase = 0.3 dB/m | The lifetime is the time at which the increase in 450 nm absorption ($A_{450}-A_{600}$) = 0.3 dB/m |
| $A_{450}$ = 0.6 dB/m | The lifetime is the time at which the 450 nm absorption ($A_{450}-A_{600}$) = 0.6 dB/m. |

Early testing measured failure by an increase in color. Since the light pipes varied in initial color depending on process and chemicals, this was an attempt to remove this factor. We have added criteria that measure the absolute amount of color, that is, the failure point is the same color for all. The results for the polymers by all four criteria are listed below.

TABLE 2

Effect of Polymer Composition and Process on Durability

| Polymer | thermal lifetime ($A_{400}$ = 2), hrs. | thermal lifetime ($\Delta A_{400}$ = 1), hrs. | thermal lifetime ($A_{450}$ = 0.6), hrs. | thermal lifetime ($\Delta A_{450}$ = 0.3), hrs. |
|---|---|---|---|---|
| 1a | <0 | 26 | <0 | 26 |
| 1b | 5 13 | 24 30 | 7 14 | 26 30 |
| 2d | 79 | 88 | 35 | 59 |
| 3 | 43 35 41 | 45 37 46 | 32 28 27 | 43 35 38 |
| 4a | 8 12 | 48 57 | 8 16 | 42 50 |

TABLE 2-continued

Effect of Polymer Composition and Process on Durability

| Polymer | thermal lifetime ($A_{400}$ = 2), hrs. | thermal lifetime ($\Delta A_{400}$ = 1), hrs. | thermal lifetime ($A_{450}$ = 0.6), hrs. | thermal lifetime ($\Delta A_{450}$ = 0.3), hrs. |
|---|---|---|---|---|
| 4b | 1 2 | 13 18 | <0 <0 | 14 15 |
| 4c | <0 49 | 4 58 | <0 51 | 3 61 |
| 5 | 44 75 | 78 99 | 81 62 | 113 104 |
| 6 | 56 112 | 69 114 | 43 88 | 81 122 |
| 7b | 44 67 | >46 62 | 28 50 | 43 55 |
| 7c | 37, 53 | 50, 62 | 14, 18 | 41, 51 |
| 8a | 178 254 | 212 | 195 311 | 321 |
| 8b | 199 | 156 | 264 | 229 |
| 8c | 169, 127 | 159, 122 | 256, 183 | 241, 156 |
| 8d | 164, 185 | 148, 172 | 250, 268 | 209, 230 |

Vinyl contents above about 0.5 per 1000 monomer units give low stability. Vinyl contents below about 0.5 give high durability. An initial color ($A_{450}$–$A_{600}$) of less than about 0.5 gives very good durability.

The photothermal stability of the above polymers was equivalent to or slightly better than the standard polymers, as measured by transmission ratios of aged and unaged samples exposed at 100° C. to 12–15 lumens/square millimeter of light from a General Electric XMH-60 lamp with an Optivex filter.

We claim:

1. A crosslinkable core mixture for a subsequently-cured composite which mixture contains a thermoplastic core polymer, the thermoplastic core polymer having a weight average molecular weight from about 2,000 to about 250,000 daltons and a vinyl end-group content of below 0.5 per 1000 monomer units, the core mixture comprising
   (a) a thermoplastic core polymer comprising
      i) from 80 to 99.9 weight percent of polymerized units of a $C_1$–$C_{18}$ alkyl acrylate or mixtures thereof with up to 50 weight percent of the $C_1$–$C_{18}$ alkylacrylate of polymerized units of a $C_1$–$C_{18}$ alkyl methacrylate;
      ii) from 0.1 to 18.2 weight percent of polymerized units of a functionally reactive monomer, and
      iii) from 0 to about 10 weight percent of polymerized units of a refractive index increasing monomer selected from styrene, benzyl acrylate, benzyl methacrylate, phenylethyl acrylate or phenylethyl methacrylate;
      iv) 0.002 to 0.3 weight percent residual molecules of or of decomposition products of an initiator of polymerization, including end groups on the thermoplastic core polymer, the initiator having a half-life at 60° C. of 20 to 400 minutes;
      v) from 0.2 to 2.0 weight percent of residual molecules of or of decomposition products of a chain transfer agent, including end groups on the thermoplastic core polymer;
   (b) from 0.1 to 10 weight percent, based on the crosslinkable core mixture weight, of a reactive additive.

2. The crosslinkable core mixture of claim 1, further containing a cladding polymer which surrounds the core mixture.

3. The crosslinkable core mixture of claim 2 wherein the cladding polymer is a fluoropolymer, and wherein the crosslinkable core mixture within the extruded fluoropolymer cladding and the extruded fluoropolymer cladding are in substantially complete contact.

4. The crosslinkable core mixture of claim 3 wherein the percentage of polymerized units of a $C_1C_{18}$ alkyl acrylate is 80 to 99.5 weight percent ethyl acrylate, wherein the chain transfer agent is an aliphatic mercaptan of from one to twenty carbon atoms, and wherein the initiator of polymerization is an azo compound.

5. The crosslinkable core mixture of claim 3 wherein the functionally reactive monomer is present at a level of from about 0.5 to about 12 weight percent and is selected from 2-methacryloxyethyltrimethoxysilane, 3-methacryloxypropyltrimethoxysilane, 3-acryloxypropyltrimethoxysilane, vinyltrimethoxysilane, vinyltriethoxysilane, or mixtures of these, and wherein the reactive additive is water and a silane condensation reaction catalyst.

6. The crosslinkable core mixture of claim 5 wherein the silane condensation reaction catalyst is a dialkyltin dicarboxylate.

7. The crosslinkable core mixture of claim 6 wherein the uncrosslinked copolymer is formed from polymerized units of 94 to 98 weight percent ethyl acrylate and from about 2 to about 6 weight percent of 3-methacryloxypropyltrimethoxysilane, and the silane condensation reaction catalyst is dibutyltin diacetate.

8. A flexible light pipe product containing the crosslinked core mixture of claim 2, wherein the product has good light transmittance wherein the differential transmission loss between light wavelengths of 400 nm to 600 nm is equal to or less than 1.0 decibel per meter as measured by a "cutback" interference filter method; excellent thermal stability, wherein a change in the differential transmission loss between light wavelengths of 400 nm to 600 nm is equal to or less than 1.0 decibel per meter after >100 hours of exposure to a temperature of 120° C., as measured by a non-destructive interference filter method; good flexibility, wherein the product, at 20° C., survives without core fracture a 180° bend at a bend radius which is less than or equal to five times the diameter of the cured core; and good hardness properties, wherein the Shore "A" hardness is less than 90 after 50 days of exposure at 120° C.

9. A process for preparing a crosslinkable core mixture for a subsequently-cured composite comprising a coextruded cladding polymer and a coextruded crosslinkable core mixture, which mixture contains a thermoplastic core polymer having a weight average molecular weight from about 2,000 to about 250,000 daltons and a vinyl end-group content of below 0.5 per 1000 monomer units, the process comprising
   a.) preparing an admixture of
      i) from about 80 to about 99.9 weight percent of a bulk monomer mixture selected from a $C_1$–$C_{18}$ alkyl acrylate or mixtures thereof with up to 50 weight percent of the bulk monomer mixture of a $C_1$–$C_{18}$ alkyl methacrylate;

ii) from about 0.1 to about 18.2 weight percent of a functionally reactive monomer, and iii) from 0 to about 10 weight of a refractive index increasing monomer selected from styrene, benzyl acrylate, benzyl methacrylate, phenylethyl acrylate or phenylethyl methacrylate;

b) adding 0.002 to 0.3 weight percent, based on the uncrosslinked copolymer weight, of an initiator of polymerization which has a half-life at 60° C. of 20 to 400 minutes;

c) prior to, simultaneously, or after the addition of the initiator, adding 0.2 to 2.0 weight percent, based on the uncrosslinked copolymer weight, of a chain transfer agent;

d) charging the monomer admixture, initiator, and chain transfer agent reaction mixture to a constant-flow stirred reactor heated to 70–120° C., to form a polymerized, non-crosslinked, crosslinkable core mixture to a devolatilizing apparatus to remove unreacted monomers;

e) prior to, during, or after the devolatilization and/or co-extrusion, adding from 0.1 to 10 weight percent, based on the crosslinkable core mixture weight, of a reactive additive;

f) coextruding the crosslinkable core mixture and the cladding polymer to form a curable composite.

10. The process of claim 9 wherein the coextruded cladding polymer and a coextruded crosslinkable core mixture are continuously, concurrently and coaxially extruded, wherein the cladding polymer is a molten fluoropolymer, wherein the extruded crosslinkable core mixture within the extruded fluoropolymer cladding and the extruded fluoropolymer cladding are in substantially complete contact after filling the extruded tubular cladding with the extruded crosslinkable core mixture, wherein the curing is conducted subsequently and separately from the extrusion and cladding operation, and wherein a portion of the reactive additive is added to the core mixture after the co-extrusion.

11. A flexible light pipe product by the process of claim 9 or 10 wherein the product has good light transmittance wherein the differential transmission loss between light wavelengths of 400 nm to 600 nm is equal to or less than 1.0 decibel per meter as measured by a "cut-back" interference filter method; excellent thermal stability, wherein a change in the differential transmission loss between light wavelengths of 400 nm to 600 nm is equal to or less than 1.0 decibel per meter after >100 hours of exposure to a temperature of 120° C., as measured by a non-destructive interference filter method; good flexibility, wherein the product, at 20° C., survives without core fracture a 180° bend at a bend radius which is less than or equal to five times the diameter of the cured core; and good hardness properties, wherein the Shore "A" hardness is less than 90 after 50 days of exposure at 120° C.

* * * * *